Figure 10:
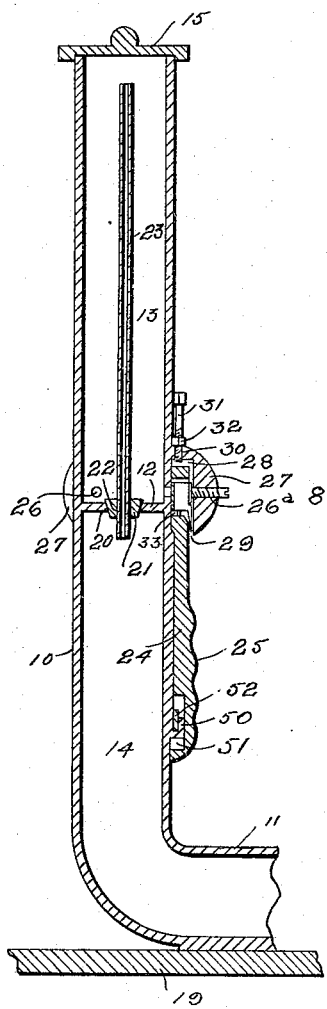

C. E. BECKWITH.
RUBBING DEVICE FOR ANIMALS.
APPLICATION FILED JULY 31, 1912.
1,200,299.
Patented Oct. 3, 1916.
2 SHEETS—SHEET 1.
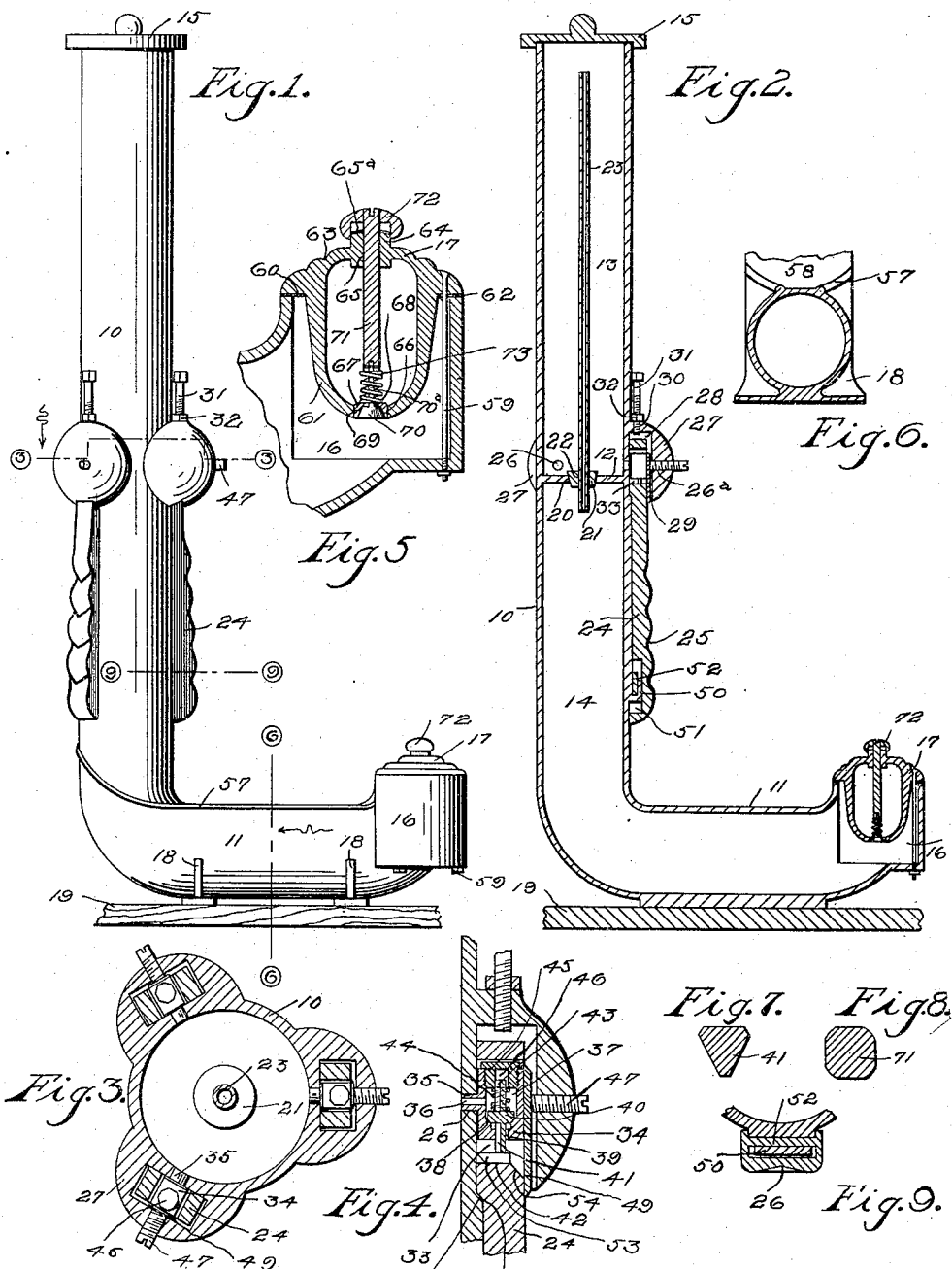

C. E. BECKWITH.
RUBBING DEVICE FOR ANIMALS.
APPLICATION FILED JULY 31, 1912.

1,200,299.

Patented Oct. 3, 1916.
2 SHEETS—SHEET 2.

WITNESSES
Mildred F. Boman
Robert C. Lovett

INVENTOR
Charles E. Beckwith
BY LaPorte & Bean
ATT'YS.

UNITED STATES PATENT OFFICE.

CHARLES E. BECKWITH, OF PEORIA, ILLINOIS.

RUBBING DEVICE FOR ANIMALS.

1,200,299.  Specification of Letters Patent.  Patented Oct. 3, 1916.

Application filed July 31, 1912. Serial No. 712,415.

*To all whom it may concern:*

Be it known that I, CHARLES E. BECKWITH, a citizen of the United States, residing at Peoria, in the county of Peoria and State of Illinois, have invented certain new and useful Improvements in Rubbing Devices for Animals, of which the following is a specification.

My invention has reference to improvements in that character of devices against which animals may rub parts of their bodies for the purpose of distributing thereon a suitable substance, preferably a liquid or fluid, to rid the animals of parasites which may be common to any such animals and to alleviate any skin irritation or disease, and which said liquid or fluid may contain certain ingredients having a curative power.

Devices having for their object, the same object for which my invention may be employed have been invented and put into use, but such devices have been adapted to contain and to distribute upon the body of the animal an oily substance of the same consistency as axle grease, but they have been objectionable for several reasons; such for instance, that they contain coloring matter which not only discolors the body of the animal but must be either under the control of a force-feeding mechanism in the device, or if not, are subject to the operation of parts against which the animal will rub, and under extreme heat will melt into liquid form and not being properly controlled will discharge itself from the machine and run over the ground, thereby creating a great waste of material. Prior to the introduction of devices of this character it had been the custom among farmers and other raisers of small animals, to dip the animals in a suitable oil or liquid to rid them of parasites common to such animals and for the purpose of alleviating any skin irritation or disease, but such dipping was found injurious owing to the shock to the animal. With my device I do away with all of the disadvantages arising from the use of any substance having the consistency of axle grease and also such disadvantages arising from the dipping of the animal, and provide a rubbing device in which may be contained a suitable oil or liquid and which is controlled by valves, and may not be discharged or fed from the said device, except through the operation of parts actuated by the animal rubbing or pressing against the same, which will free the oil, allowing it to run out of the device in very small quantities upon the rubbing parts to be distributed over the body of the animal.

The invention consists essentially of a stand or other suitable support adapted to contain a suitable oil or other liquid and which is provided at suitable points with a plurality of valve controlled openings or orifices, said valves normally closing said openings or orifices to prevent the discharge or egress of the oil or liquid from the device, but which will be under the control of parts against which the animal may rub or press, and in so rubbing or pressing, momentarily move the valves to allow the oil or liquid to be discharged from the device on to such parts and to be smeared over the body of the animal.

That the invention may be more fully understood reference is had to the accompanying drawings forming a part of this specification, in which:—

Figure 11:
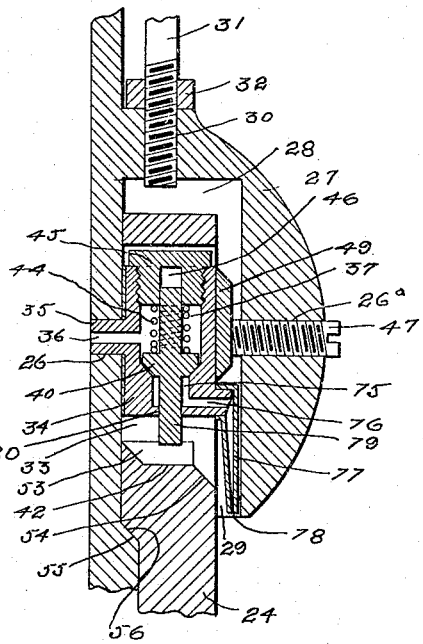
Figure 12:
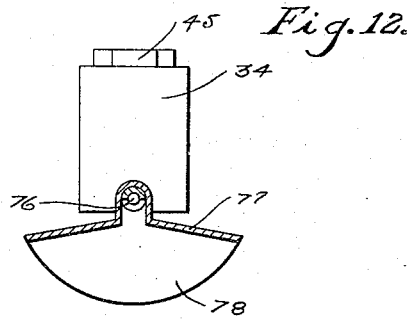

Figure 1 is an elevation of my improved rubbing device; Fig. 2 is a vertical sectional view of the device shown in Fig. 1; Fig. 3 is an enlarged cross section as the same would appear if taken on line 3—3 of Fig. 1, looking in the direction of the arrow on said figure; Fig. 4 is an enlarged sectional detail of one of the valves and associated parts, employed in connection with one of the openings or orifices on the vertical portion of the device, seen in Figs. 1 and 2; Fig. 5 is an enlarged sectional view of the valve mechanism and associated parts, shown at the end of the horizontal portion of the device, seen in Figs. 1 and 2; Fig. 6 is a cross section as the same would appear if taken on line 6—6 of Fig. 1, looking in the direction of the arrow on said figure; Fig. 7 is an enlarged cross section showing the construction of the stem of the valve shown in Fig. 4; Fig. 8 is an enlarged cross section showing the construction of the stem of the valve shown in Fig. 5; Fig. 9 is an enlarged cross section showing the locking means for holding the rubbing parts in operative position on the vertical portion of the device, and as the same would appear if taken on the line 9—9 of Fig. 1; Fig. 10 is a vertical section of the device somewhat similar to that shown in Fig. 2, with the exception that I have modified the structure of the valve casing and the manner of discharging the substance from said valve casing. Fig. 11 is an enlarged detail sectional view somewhat similar to Fig. 4 excepting that it shows a modification in the valve casing and the manner of discharging the substance therefrom, and Fig. 12 is a face view of the valve casing with a spraying device which is attached thereto, shown in section.

Like characters of reference indicate corresponding parts throughout the figures.

In the preferred form of the device I construct it with the long vertical post portion 10 and the shorter horizontal portion 11, the two parts being preferably cast integral, although they may be cast separately and suitably attached to each other. The vertical and horizontal portions of the device are cast hollow, as shown in Fig. 2, to form interior compartments or chambers; however, the part 10 is provided with a partition 12, located at a suitable point in its length, see Fig. 2, which divides the vertical post portion 10 into compartments or chambers 13 and 14; the compartment 14 merging into and also forming the compartment or chamber for the horizontal portion 11 of the device. The compartment or chamber 13 of the vertical post portion 10, is open and adapted to be closed by the removable cap 15. The end of the horizontal portion 11 of the device is formed with the vertically disposed cylindrical portion, having the chamber 16 in communication with the chamber 14 and said chamber 16 is open at its upper end and adapted to be closed by the cap or closure 17, to be more fully described.

The vertical post portion 10 of the device may be supported by the horizontal portion 11, which has seat-flanges or supporting portions 18 for securing the same to a rest or platform 19, whereby the device may be stood upon the ground in any suitable place, or located within a building or wherever it is desirous of having such a device. Devices of this character are used more especially as hog-rubbing-posts and are therefore adapted to be placed upon the ground in a lot where the hogs are kept.

The partition 12, in the post portion 10 of the device, is provided with the tapered opening 20 and in said opening is adapted to be carried the tapered plug 21 having the centrally disposed opening 22 through which may be inserted the elongated stem 23. When said stem 23 is inserted through said plug, as shown in Fig. 2, it projects through the plug into the compartment or chamber 14, with the upper end of said tubular stem removed a suitable distance below the upper end of said post 10. I provide the post portion 10 with the chambers 13 and 14 so that the valve controlled openings or orifices for the rubbing parts on the post will communicate with the chamber 13 and the valve controlled opening in the horizontal portion 11 will communicate with the chamber 14. In this way should trouble arise in connection with the parts on the post portion 10, the rubbing part on the horizontal portion 11 will not be interfered with, and vice-versa. To fill the chambers in the post and horizontal portion thereof, the cap 15 is removed and oil or other suitable liquid is poured into the chamber 10. As the chamber 13 fills, the oil or other liquid will enter the top of the tubular stem 23 and run down into and fill the chamber in the horizontal and lower vertical portion of the device.

On the post portion 10 I provide a plurality of rubbing parts or members 24. These parts or members are preferably elongated plates of a suitable length and preferably spaced equi-distant around the post portion 10, as shown in Figs. 1 and 3. The rubbing faces of the parts 24 are irregular, as best seen in Figs. 1 and 2, being corrugated, serrated or formed with reversely curved portions, as indicated at 25, and which taper toward the center of said parts, as at 26, see Fig. 9, so that the oil or other liquid finding its way onto the rubbing faces of the parts 24 will be directed to and run down the center of the rubbing faces of said parts and result in the proper distribution of the same on the body of the animal, rubbing or pressing against said parts. It is preferable to have the rubbing parts 24 move up and down against a flat face on the post portion 10 and this may be accomplished by casting that part of the post 10 on which the parts 24 move thick enough to provide such flat face, or additional parts or strips may be attached or suitably secured to the surface of the post portion 10 on which said parts 24 may move. In Fig. 2, one of such parts 24 is shown in cross section and the wall on which the same moves is shown considerably thicker than the remainder of the wall of the post, indicating that it has either been cast in that form or an additional part secured thereto.

At or near the base of the chamber 13 of the post portion 10, the wall of said post portion is provided with a plurality of egress openings or orifices 26, spaced equi-distant around said wall in the same manner and of the same number as said rubbing parts 24. On the outside of said post portion 10 and coinciding with said egress openings or orifices 26, are provided the dome-like caps or shields 27, which may be cast or otherwise suitably attached to the outer wall of said post portion 10; said caps or shields 27 are provided with the interiorly arranged chambers or recesses 28 opening out of the lower portion of said caps or shields, as at 29. I prefer to cast the caps or shields 27 integral with the post portion 10 and in so doing it is necessary to bore the egress openings or orifices 26 in the wall of the post 10, by first boring the corresponding opening 26ª in the wall of said caps or shields 27, see Figs. 2 and 4; the openings 26 in the wall of the post portion 10 serve as egress openings or orifices for the oil or liquid which is to find its way on to the rubbing surfaces of the parts 24, whereas the openings 26ª in the caps or shields 27 will receive adjusting screws and are therefore threaded, as will be understood. I also provide the upper wall portion of said caps or shields 27 with the threaded openings 30 in which may be carried and have a threaded relation, the screws or bolts 31, which may be held in adjusted positions by means of the lock nuts 32. The bolts or screws 31 extend down into the chambers or recesses 28 of said caps or shields 27 and are employed for the purpose of regulating and controlling the stroke or movement of the rubbing parts 24 on the post portion 10 and thereby regulate or control the amount of oil or fluid passing from the chamber 13 on to the parts 24, as will more fully appear.

The upper ends of the parts 24 are provided with the transverse openings 33, see Figs. 2, 3 and 4, and through said openings, when said parts 24 are in operative position on the post 10, are carried suitable valves for controlling the egress of the oil or other fluid from the chamber 13 in the post portion 10 to run upon the surface of said parts 24. The construction of these valves is best seen in Fig. 4, wherein the same is shown including a casing 34, of suitable depth and of substantially the width of the openings 33 through the parts 24. Said casings 34 have the elbows 35 adapted to be inserted into the openings or orifices 26 in the wall of the post 10, and said elbows are provided with the passage or feed-ways communicating with a chamber 36 in the casings 34, and said chambers in the lower ends of the casings 34 are provided with a valve seat 38 and the smaller, preferably round openings 39, passing through and opening out of the lower wall of said casings 34. In the chamber 37 of each casing 34 is carried a valve member 40 adapted to normally rest on the valve seat 38, and said valve member 40 is provided with the depending and preferably triangularly shaped stem 41 passing through the round opening 39 in the casing 34; the end of said stem 41 being normally a short distance above the lower wall portion 42 of the transverse opening 33, through said parts 24. Each valve member 40 is also provided with the upwardly extended stem 43 around which is carried a spring 44, said spring bearing against said valve member and against a cap 45 screwed into the upper end of the chamber 37 of the casing 34, said spring acting to hold the valve member 40 in the normally closed position, shown in Fig. 4. The cap 45 is provided with the recess 46, in which is operatively carried the stem 43 and which allows for the necessary vertical movement of the valve member 40, under pressure of the parts 24, when the said parts 24 are moved into engagement with the lower stem 41. To assemble the parts 24 and the valve casings 34 and valves therein, on the post portion 10, of the device, each casing 34 with its valve is placed in the transverse opening 33 in a part 24 and the upper end of each part 24 is inserted into a chamber or recess 28, of a cap or shield 27, and when each casing 34 is in a position with its elbow 35 coinciding with an opening 26 in the wall of the post portion 10, said elbow 35 is forced into said opening 26 by inserting the screw 47 into the threaded opening 26ª in the cap or shield 27 and screwing the screw 47 into said threaded opening 26ª, its inner end may be caused to bear against a valve casing 34 and force the elbow 35 into the opening 26. I prefer to put a washer or gasket 48 around the inner end of each elbow 35 and against the valve casing 34, so that, when the elbow 35 has been inserted in the opening 26 and the wall of the casing 34 has been forced against the outside wall of the post 10, the washer or gasket 48 will prevent leakage of the oil or fluid around the elbow 35. I also prefer to provide a bearing plate 49 with which each screw 47 will engage, when the elbow 35 of the valve casing 34 is forced into the opening 26. This plate 49 may be inserted into the chamber or recess 28 in the cap or shield 27 and between the wall thereof and the outside face of the valve casing 34 and also the part 24, which is best seen in Fig. 4. This bearing plate is also much longer than the valve casing 34 and extends down and has a bearing and scraping relation with the upper outside face of the part 24. It will be observed from the manner of carrying and supporting the valve casings 34 and holding the bearing plate 49 thereagainst, that the parts 24 may have movement longitudinally and across said valve casings 34, without interfering with the same, and the screw 47 will firmly hold the valve casings 34 and associated parts in operative relation on said post 10, and the bolt or screw 31 may be adjusted to limit the upward movement of the parts 24, and when so adjusted the movement of the stem 41 and valve member 40 are correspondingly limited which will govern the amount of oil or liquid discharged by the valve on to the parts 24. After the parts 24 have been moved upward for the purpose of releasing the valve members 40, said parts 24 will drop by reason of gravity and because of their own weight, and the valve members will close under the action of the springs 44.

For locking the parts 24 in operative position on the post portion 10 of the device, I provide the vertically extending lips or plates 50, which may be of suitable length and spaced at a distance from the wall of the post 10, being secured thereto at their lower ends, in any suitable manner, and the lower rear face of the parts 24 are recessed as at 51 and provided with the cross members 52, which are adapted, when the upper ends of the parts 24 are inserted into the extreme upper portions of the chambers or recesses 28 in the caps or shields 27, to be in a position to be passed over and inserted between the lips or plates 50 and the wall of the post portion 10, somewhat in the manner shown in Fig. 2. The cross plate 52 bearing against the lips or plates 50 will prevent any outward movement or dislodgment of the lower ends of the parts 24 and yet allow the vertical movement necessary of such parts to engage and move the valve member 40 from the valve seat, allowing the oil or other liquid to pass from the chamber 13 in the post 10 through the valve casing 34 and on to the rubbing face of the parts 24. Said cross plates 52 have for their further object to limit the downward movement of the parts 24 as well as to hold the same snugly against the post portion 10 and prevent any mud or dirt getting between said parts and said post.

To insure the oil or other liquid in the chamber 13, running down on the rubbing faces of the parts 24, I construct the wall 42 of the openings 33 in the parts 24 with the tapering portions 53 and 54, so arranged that, when the oil passes from the chamber 37 of the valve casing 34 through the opening 39 and down on to the wall 42 of the parts 24, said oil or other liquid will be directed on to the outside rubbing faces of said parts 24. I have previously stated that the bearing plate 49 extended down on to the outside face of the parts 24, this is for the purpose of acting as a guard or scraper to keep any substance such as mud or the like, which may be rubbed on the parts 24 by the animal, from finding its way into the opening 33 in the parts 24 and from thence into the valves of the valve casings 34. As an additional means of limiting the downward movement of the parts 24, the wall of the post 10 may be provided with the offset portions 55 and provide the parts 24 with a shoulder 56 adapted to engage and rest upon the offset portions 55.

An examination of Figs. 1, 2 and 5 will show that the vertically disposed cylindrical chamber 16, extends a suitable distance above the upper surface of the horizontal portion 11. I also desire to call attention to the fact that I have provided a rubbing means on the surface of the horizontal portion 11 which extends up on to the lower part of the vertical post portion 10, and that such rubbing means comprises the ribs 57 disposed upon opposite sides of an upper flat surface 58, see Fig. 6, and said ribs extend from the cylindrical casing inclosing the cylindrical chamber 16, to a point on the post portion 10, just below the lower ends of the parts 24. It will thus be seen that any oil or liquid running down on to the faces of the parts 24, which if not taken up by the body of the animal, will follow the ribs 57 and remain upon the upper surface of the horizontal portion 11 of the device between said ribs so that, the animal rubbing upon this portion of the device will take up and smear on his body the oil or liquid which may be upon the horizontal portion of the device.

The cap or closure 17 for the upper end of the chamber 16 may be secured thereto by any suitable means, such for instance, by a bolt or bolts 59, see Fig. 5. This cap or closure 17 is formed with the flanged portion 60 adapted to rest on the upper edge of the casing inclosing the cylindrical chamber 16 and the said cap or closure 17 has the cylindrical or tubular neck 61 extending down into the chamber 16.

62 denotes a washer or gasket disposed between the flange 60 and the upper edge of the casing inclosing the chamber 16, to prevent leakage, as will be understood. The upper surface of the cap or closure 17 is formed or suitably provided with corrugations, depressions or any suitable irregular surface 63 and with the centrally disposed boss 64, having the opening 65 therethrough. The upper surface of boss 64 is tapered, as shown, and provided with a plurality of radially arranged grooves, depressions or feed-ways 65. The lower end of the cylindrical or tubular neck 61 of the cap or closure 17, is provided with an opening 66, in which is preferably carried a removable plug 67, and said plug has the centrally disposed opening 68 and the valve seat 69. Normally seated in said valve seat 69 is a valve member 70 having a stem $70^a$ passing through the opening 68 in the plug 67, and said stem is suitably secured to a rod 71 of larger diameter than said stem $70^a$ and which passes up through and has movement in the opening 65 in the boss 64, and on the outer end of said rod is a cap 72 encircling and adapted to have movement up and down on the boss 64, see Fig. 5. Around the stem $70^a$ and bearing between the plug 67 and the lower end of the rod 71 is a coil spring 73, which normally holds the valve member 70 against the valve seat 69, to close the opening 68. Pressure being applied to the cap 72 it may be lowered on the boss 64, moving with it the rod 71 against the tension of the spring 73 and also move the valve member 70 off of the valve seat 69 allowing the oil or liquid to pass through the opening 68 into the cylindrical or tubular neck 61, from whence it may find its way up around the rod 71 through the grooves, depressions or feed-ways 65 on the surface of the portion 64 and on to the irregular surface of the cap or closure 17, such irregular surface as described, being such, that the oil or liquid may be retained thereon until smeared or distributed over the body of the animal bearing or rubbing against the same. The opening 65 through the portion 64 of the cap or closure 17, is preferably round, whereas the rod 71, as shown in Fig. 8 is flattened on its several sides, leaving a very small space around the same to allow the oil or liquid to pass up through the opening 65 and find its way on to the surface 63 of said cap or closure 17.

I provide the cap or closure 17 with the cylindrical or tubular neck 61 and place the valve member 70 at the base of the neck in the chamber 16 for the following reasons: When the chamber 14 and chamber 16 are filled with oil or liquid, considerable pressure is exerted on the valve member 70 and if said valve was at or near the top of the chamber 16 and just beneath the opening 65 in the portion 64 of said cap or closure 17, when the cap 72 was depressed and the valve member 70 moved from its seat, such pressure of the oil or liquid would have a tendency to cause the oil or liquid to spurt out of the chamber and more oil or liquid would be discharged than was desirable. Then again, with the valve member 70 placed close to the outlet opening 65 in the cap or closure 64 the more chance there would be for dirt to get in and clog the valve. On the other hand, by providing the neck 61 I have a supplemental chamber for holding the oil or liquid and the inlet to such supplemental chamber is controlled by the valve member 70. When the valve is opened the oil or liquid will be forced from the chambers 14 and 16 into said supplemental chamber. The opening or orifice controlled by the valve member 70 is small so that only a limited amount of oil or liquid can get into the supplemental chamber and each time that the valve is opened the pressure of the oil or liquid through the opening or orifice 68 will force the necessary amount of oil or liquid up through the opening 65 in the cap or closure 17, and the location of the valve member 70 will insure the valve being kept free from dirt or becoming clogged.

It is well known that hogs will rub against almost any object, so in a device of this character, which is to serve as a rubbing device for hogs, it is preferable to provide the same with a number of rubbing surfaces or parts and all arranged so that the oil or liquid which may be allowed to run over such surfaces or parts may be retained thereon until smeared or distributed on the surface of the animal rubbing or pressing against the same, and prevented from running off on to the ground. The natural tendency of the animal when rubbing against the device, is to rub up and down, and I therefore provide the rubbing parts on the post portion of the device to move vertically and when so moved, to release the oil or liquid which will run over the surface of such parts and be smeared or distributed on to the body of the animal. Any excess of the oil or liquid running off of the surface of such rubbing parts on the post portion, will find its way down on to the upper surface of the horizontal portion 11 between the ribs 57, against which the animals often rub and they thereby take up and distribute over their bodies the oil or liquid which finds its way on to the upper surface of such horizontal portion of the device. The rubbing portion of the device which is composed of the cap plate or closure 17 and the cap 72, is used by the animal against which it rubs various portions of its body and is particularly adapted for the animal to rub the inside of its ears. This is a portion of the body which it has heretofore been unable to treat very easily, but which it is very easy to treat with my device, and with a construction such as I show. By an examination of Fig. 5 it will be observed that the animal may place its ear over the cap 72, which is especially constructed for this purpose, and move the valve member 70 from the seat 69 and constant rubbing against the cap or closure 63 and cap 72 will smear the cap 72 with the oil or liquid, which will find its way into the ear or on the surface thereof, when the animal applies its ear to said cap 72.

With a valve such as I employ in connection with Figs. 1, 2 and 4, for controlling the discharge of the substance from the stand or post 10 through the valve casing 34, the substance is intended to be discharged in a manner to run down the rubbing face of the rubbing members 24. However, this is not essential and it is not absolutely necessary that the valve mechanism should be constructed so that the substance will run down the rubbing faces of the parts 24, as the discharge may be such that the substance will be sprayed on to the body of the animal and the rubbing of the animal against the rubbing parts will tend to smear the substance over the animal's body. I accomplish this result with a valve structure such as shown in Figs. 10, 11 and 12. In this structure the discharge orifice in the valve casing 34 which is here indicated as 75 is turned at right angles and opens out of the front of the valve casing 34, as shown in Fig. 11, through an elbow 76. Suitably connected with the elbow 76 is a spraying nozzle 77 which is flared as at 78 to allow the substance to spread and cover a large area as the same is discharged through the nozzle 77. I have shown the nozzle 77 on the flared portion 78 thereof, located in the lower end of the chamber or recess 28 of the cap or shield 27 and carried between the rubbing face of the part 24 and the inner vertical wall of said cap or shield 27. The operating stem of the valve member 40 is here indicated as 79, being preferably cylindrical in cross section and operating through an opening 80 in the lower wall of the valve casing 34, such opening 80 corresponding to the discharge orifice 39, see Fig. 4, but having a different function from said discharge orifice 39. In Fig. 11 the opening 80 provides for the carrying of the valve stem 79 but it is not intended as a discharge orifice, whereas the orifice 39, see Fig. 4, is the discharge orifice through which the substance is discharged on to the rubbing member 24.

What I claim is:—

1. In a device of the character described, in combination, a stand having a compartment or chamber adapted to contain a substance, and having a discharge orifice, a valve casing supported on said stand coincident with said orifice, a valve in said casing for controlling the discharge of the substance from said stand through said casing, a rubbing member movably supported on said stand, said member adapted when moved in one direction to open said valve, said member having an opening therein to receive said casing, but being independent thereof, and means for supporting the valve casing on said stand.

2. In a device of the character described, in combination, a stand having a compartment or chamber adapted to contain a substance, and having a discharge orifice, a valve casing supported on said stand coincident with said orifice, a valve in said casing for controlling the discharge of the substance from said stand through said casing, a rubbing member movably supported on said stand, said member adapted when moved in one direction to open said valve, said member having an opening therein to receive said casing, but being independent thereof, means for supporting the valve casing on said stand, and adjusting means for regulating the movement of said member.

3. In a device of the character described, in combination, a vertical tubular stand adapted to contain a substance, and having a discharge orifice, a valve for controlling the discharge of the substance through said orifice, an elongated rubbing member arranged in a vertical position on the outside of said stand and adapted to be moved up and down thereon for operating said valve, and adjusting means for regulating the upward movement of said member, the outside surface of said member being irregular to facilitate its being moved up and down when engaged by an animal.

4. In a device of the character described, in combination, a stand having a compartment or chamber adapted to contain a substance, and having a discharge orifice, a valve for controlling the discharge of the substance through said orifice, a cap or shield suitably attached to said stand to cover said valve, a rubbing member movably supported on said stand with one end carried and movable in said cap or shield and adapted when moved in one direction to operate said valve, said member having an irregular rubbing face, and means for regulating the movement of said member.

5. In a device of the character described, in combination, a stand having a compartment or chamber adapted to contain a substance, and having a discharge orifice, a cap or shield suitably attached to said stand and forming a chamber on the outside thereof communicating with said orifice, a casing supported on said stand and carried in the chamber formed by said cap or shield, said casing having an elbow extending into the orifice of the stand, a valve disposed in said casing for controlling the discharge of a substance from said stand through said casing, and a rubbing member movably supported on said stand and arranged to operate said valve.

6. In a device of the character described, in combination, a stand having a compartment or chamber adapted to contain a substance, and having a discharge orifice, a cap or shield suitably attached to said stand and forming a chamber on the outside thereof communicating with said orifice, a casing supported on said stand and carried in the chamber formed by said cap or shield, said casing having an elbow extending into the orifice of said stand, a valve disposed in said casing for controlling the discharge of the substance from said stand through said casing, and a rubbing member movably supported on said stand and arranged to operate said valve, said member having a portion movable in the chamber formed by said cap or shield and having a transverse opening to receive said valve casing, said rubbing member for the greater portion of its length having an irregular face.

7. In a device of the character described, in combination, a stand having a compartment or chamber adapted to contain a substance, and having a discharge orifice, a cap or shield suitably attached to said stand and covering said orifice, a valve casing, means for supporting said casing on said stand, a rubbing member comprising an elongated plate or bar movably supported on said stand and having a portion operating beneath said shield, said plate having a transverse opening to receive said casing and adapt said plate to be moved across said casing, the greater portion of the rubbing face of said plate being irregular, and a valve in said casing adapted to be operated by said rubbing member.

8. In a device of the character described, in combination, a stand having a compartment or chamber adapted to contain a substance, and having a discharge orifice, a cap or shield suitably attached to said stand and covering said orifice, a casing supported under said cap or shield and having a part extending into said orifice, means for supporting said casing on said stand, a rubbing member comprising an elongated plate or bar movably supported on said stand and having a portion operating beneath said cap or shield, said plate having a transverse opening to receive said casing and adapt said plate to be moved across the casing, the greater portion of the rubbing face of said plate being irregular, a valve in said casing adapted to be operated by said rubbing member, and adjusting means for limiting the movement of said rubbing member.

9. In a device of the character described, in combination, a stand having a compartment or chamber adapted to contain a substance, and having a discharge orifice, a valve for controlling the discharge of the substance through said orifice, a rubbing member comprising a plate supported to have longitudinal movement on said stand adapted to operate said valve, and means for holding said rubbing member in operative position on said stand, comprising a lip extending out from said stand, and a crosspiece on said member which is adapted to have a locking relation with said lip; such locking relation while permitting longitudinal movement of the member, preventing said member from becoming dislodged from said stand.

10. In a device of the character described, in combination, a support including a vertical stand having a compartment or chamber adapted to contain a suitable substance, the wall of said stand provided with a discharge orifice, a rubbing member including a plate movably supported on said stand, said plate having a transverse opening which is normally coincident with said orifice, a casing suitably supported on said stand within the opening in said plate and arranged to receive the substance discharged through the orifice in said stand, said casing having a discharge orifice, a valve for controlling the orifice in said casing, said valve arranged to be operated by said plate, and a scraping plate bearing on the surface of said rubbing member, said scraping plate supported in connection with said valve casing.

11. In a device of the character described, in combination, a support including a vertical stand having a compartment or chamber adapted to contain a suitable substance, the wall of said stand provided with a discharge orifice, a rubbing member including a plate movably supported on said stand, said plate having a transverse opening which is normally coincident with said orifice, adjusting means for limiting the movement of said rubbing member, a casing suitably supported on said stand within the opening in said plate and arranged to receive the substance discharged through the orifice in said stand, said casing having a discharge orifice, a valve for controlling the orifice in said casing, said valve arranged to be operated by said plate, and a scraping plate bearing on the surface of said rubbing member, said scraping plate supported in connection with said valve casing.

12. In a device of the character described, in combination, a support including a vertical stand having a compartment or chamber adapted to contain a suitable substance, the wall of said chamber provided with a discharge orifice, a cap or shield attached to said stand and having its main body portion coincident with and spaced from said orifice, a rubbing member including a plate movably supported on said stand, one end of said plate operatively carried between said stand and said cap or shield and having an opening which is normally coincident with said orifice, a casing supported on said stand within the opening in said plate and arranged to receive the substance discharged through the orifice in said stand, said casing having a discharge orifice, a valve for controlling the orifice in said casing, said valve arranged to be operated by said plate, a bearing plate suitably disposed between said cap or shield and said casing and having a scraping portion extending over a portion of the rubbing face of said rubbing member, and a securing member passing through the wall of said cap or shield and engaging said bearing and scraping plate.

13. In a device of the character described, in combination, a support including a vertical stand having a compartment or chamber adapted to contain a suitable substance, the wall of said stand provided with a discharge orifice, a cap or shield attached to said stand and having its main body portion coincident with and spaced from said orifice, a rubbing member including a plate movably supported on said stand, one end of said plate operatively carried between said stand and said cap or shield and having an opening which is normally coincident with said orifice, an adjusting screw adjustably connected with said shield and adapted to limit the movement of said rubbing member, a casing supported on said stand within the opening in said plate and arranged to receive the substance discharged through the orifice in said stand, said casing having a discharge orifice, a valve for controlling the orifice in said casing, said valve arranged to be operated by said plate, a bearing plate suitably disposed between said cap or shield and said casing and having a scraping portion extending over a portion of the rubbing face of said rubbing member, and a securing member passing through the wall of said cap or shield and engaging said bearing and scraping plate.

14. In a device of the character described, in combination, a support including a vertical tubular stand and a horizontal tubular portion connected with said stand, said stand and horizontal portion arranged to contain a suitable substance and provided with discharge orifices or openings, a plurality of rubbing members suitably supported on said stand and movable up and down thereon, said members having roughened surfaces to facilitate their upward movement when engaged by an animal, means arranged to be operated by said members for controlling the discharge of the substance from said stand, a rubbing member on the end of said horizontal portion, a valve controlled opening in said rubbing member, and rubbing members on said horizontal portion of said support and extending longitudinally thereof.

15. In a device of the character described, in combination, a support including a vertical tubular stand and a horizontal tubular portion connected to said stand, said stand at a suitable point provided with a plurality of discharge orifices, means for closing said orifices, a partition dividing said vertical stand below said discharge orifices and having an opening therethrough, a tubular stem extending through said opening, a closure for the upper end of the stand, and a closure for the end of the horizontal portion of said support.

16. In a device of the character described, in combination, a support including a vertical tubular stand and a horizontal tubular portion connected to said stand, said stand at a suitable point provided with a plurality of discharge orifices, means for closing said orifices, a partition dividing said vertical stand below said discharge orifices and having a tapered opening therethrough, a detachable plug adapted to fit the opening in said partition and having an opening therethrough, a tubular stem extending through said opening in said plug, a closure for the upper end of the stand, and a closure for the end of the horizontal portion of said support.

17. In a device of the character described, in combination, a support including a vertical tubular stand and a horizontal tubular portion connected to said stand, said stand at a suitable point provided with a plurality of discharge orifices, means for closing said orifices, caps or shields attached to said stand and having spaced portions opposite said orifices, a partition dividing said vertical stand below said discharge orifices and having an opening therethrough, a tubular stem extending through said opening, a closure for the upper end of the stand, and a closure for the end of the horizontal portion of said support.

18. In a device of the character described, in combination, a support including a vertical tubular stand and a horizontal tubular portion connected to said stand, said stand at a suitable point provided with a plurality of discharge orifices, means for closing said orifices, caps or shields attached to said stand and having spaced portions opposite said orifices, a partition dividing said vertical stand below said discharge orifices and having an opening therethrough, a tubular stem extending through said opening, a closure for the upper end of the stand, a closure for the end of the horizontal portion of said support, and means attached to said horizontal portion forming a rest for said support and for sustaining said stand in a vertical position.

19. A rubbing post stand, including a vertical tubular portion and a tubular base at right angles thereto and communicating therewith, said vertical portion having a plurality of oil egress openings, means for controlling the discharge of oil through said oil egress openings, shields attached to said stand and spaced from but covering said oil egress openings, a closure for the upper end of the stand, a closure for the outer end of the tubular base, and spaced ribs extending longitudinally of and on the outer surface of said tubular base.

20. In a device of the character described, in combination, an animal rubbing stand having a chamber for containing a substance, and a horizontal base portion communicating with the stand portion, a means for controlling the release of the substance from said chamber, a means for controlling the release of substance from the base portion, a plurality of elongated rubbing members arranged in a perpendicular position on the outside of said stand and movable thereon, the movement of either one of said members adapted to actuate the controlling means to release the substance in the chamber, the outside surface of each rubbing member being provided with spaced rubbing portions which converge to the center of the plate, whereby the substance discharged on the rubbing members will be directed down the center of said members.

21. In a device of the character described and in combination, a stand having a compartment or chamber adapted to contain a substance to be applied to an animal, a rubbing member on said stand, said rubbing member being in the form of an elongated plate, one face of said plate being provided with stepped portions shaped so as to receive and direct the substance received thereon down the center of said plate, and means for discharging said substance from said compartment or chamber on to said rubbing member.

22. In a device of the character described and in combination, a stand having a compartment or chamber adapted to contain a substance to be applied to an animal, a rubbing member on said stand, said rubbing member being in the form of an elongated plate, having a roughened rubbing surface on one of its side faces, said roughened surface comprising stepped portions shaped so as to receive the rubbing substance and direct it down the center of said plate, said stepped portions also providing engaging means for the animal rubbing against said plate, and means for discharging said substance from said compartment or chamber on to said rubbing member.

23. A hog oiler including in its construction an elevated receptacle, a supporting part therefor including a base having an extended fluid receiving portion lying outward from and extending away from the said supporting member in position to be used as a rubbing part, a rubbing bar receiving fluid from the receptacle, its lower extremity terminating above the position of the said portion, the latter receiving fluid therefrom.

24. A dip distributing device comprising a vertically reciprocably mounted rubbing plate, a container above the plate having means of communication for delivering liquid to the plate, and a valve closing the means of communication, having a portion disposed for being struck by a portion of the plate for permitting discharge from the container onto the plate.

25. In a dip distributing device, the combination of a plate adapted to be engaged by the back and sides of an animal, a container for a dip distributer adapted to be engaged by the abdominal portions of the animal, means for delivering the dip to the exposed surface of the rubbing plate, and means for directing excess dip from the rubbing plate to the container.

26. In combination in a device of the character described, a centrally arranged supporting element, an oil-tank supported thereby, a plurality of valves in communication with said tank, and a plurality of vertically elevatable rubbing plates arranged around the supporting element and each one thereof adapted to operate one of said valves.

27. A device of the character described including a support, a rubbing element slidably mounted thereon, a receptacle mounted upon the support and adapted to contain a liquid, and a valve normally closing said receptacle and provided with a stem projecting exteriorly of the receptacle in the path of said rubbing element, the said rubbing element being adapted for movement to engage said stem to open the valve and permit the discharge of the liquid upon the said rubbing element.

In testimony whereof I affix my signature in presence of two witnesses.

C. E. BECKWITH.

Witnesses:
 CHAS. W. LA PORTE,
 MILDRED F. BOMAN.

Copies of this patent may be obtained for five cents each, by addressing the "Commissioner of Patents, Washington, D. C."